Oct. 3, 1967 H. F. RAYFIELD 3,345,007

TAPE APPARATUS

Filed May 28, 1965 3 Sheets-Sheet 1

INVENTOR.
HARRY F. RAYFIELD
BY Christie, Parker & Hale
ATTORNEYS

INVENTOR.
HARRY F. RAYFIELD
BY Christie, Parker & Hale
ATTORNEYS

Oct. 3, 1967 H. F. RAYFIELD 3,345,007
TAPE APPARATUS
Filed May 28, 1965 3 Sheets-Sheet 3

INVENTOR.
HARRY F. RAYFIELD
BY
Christie, Parker & Hale
ATTORNEYS.

United States Patent Office 3,345,007

Patented Oct. 3, 1967

3,345,007

TAPE APPARATUS

Harry F. Rayfield, Arcadia, Calif., assignor to Burroughs Corporation, Detroit, Mich., a corporation of Michigan Filed May 28, 1965, Ser. No. 459,625

17 Claims. (Cl. 242—55.12)

This invention relates to tape apparatus and more particularly to multiple station tape storage apparatus.

Tape transport systems have been extensively employed in the art including the digital computing art. One example of the prior art tape transport systems particularly adapted for use in a digital system is disclosed in Patent No. 2,921,753. In general, tape transport systems are relatively high cost devices since some of the components thereof require high precision in their manufacture and control. When a plurality of tape transport devices are required, it has been common practice to house a plurality of individual tape transport systems in a single cabinet. This, of course, requires that each of the high precision components be included with each individual package and is essentially a convenient assembly of individual units in a single rather than a multiplicity of housings. Furthermore, such an arrangement has an overall size or space requirement that is dictated by the sizes of the individual tape stations. In one particular prior art multiple station device, the tape stations are arranged in horizontal and vertical decks. For a four station tape device, two horizontal tape stations are arranged with two vertical decks to reduce the overall size. Arranged in this fashion, the cabinet is 30 inches by 60 inches and stands 72 inches high. Another element that is important in the overall size and cost of these multiple station tape devices is the vacuum column for controlling the winding and unwinding speeds of the tape reels through detecting and signalling the loop lengths. Such vacuum column loop controls are exemplified by the systems described in said Patent No. 2,921,753.

The present invention provides an improved, economical multiple station tape transport device that requires less space than conventional multiple station tape devices presently commercially available. By minimizing the number of precision components that are employed and sharing components, the tape transport system disclosed herein is on the order of two-thirds of the cost of present day systems. Furthermore, with reference to the cabinet sizes of present day systems, mentioned hereinabove for a four station assembly, the tape system of the present invention requires a cabinet that is 30 inches by 30 inches and stands 42 inches high. The four tape stations are arranged in the same plane to effect this desired space saving. In addition, the arrangement of the tape stations of the present invention is adapted for the easy sealing of the tape handling compartment and utilizes a single closed vacuum system. The vacuum system is further advantageously arranged with a means for filtering the air circulating through the vacuum column system and thereby reducing the atmosphere contamination and maintenance required for the system.

From a structural standpoint, the present invention comprises four tape stations arranged at the same, preferably horizontal, level with each station defined by means of a pair of coaxially arranged tape reels mounted at said level in a spaced apart relationship. Individual transducing means are spaced adjacent each of the tape stations and each are mounted on a single precision deck.

The tape from each pair of reels is guided to a common work plane formed by the surface of the deck, where it is guided past the adjacent transducing means.

To control the rate at which the supply reel unwinds the tape and the takeup reel winds tape, four dual vacuum columns are employed for the four stations with each tape station utilizing an individual column of a pair of vacuum columns spaced adjacent the station. The dual vacuum columns are arranged to form a cross defining four quadrants. Thus, the pair of vacuum columns corresponding to each reel pair are in orthogonal relationship to one another such that the reel pair subtends the right angle formed by the vacuum columns. The dual vacuum columns are all connected in a closed system to a single vacuum source having a filter for cleaning the air circulating through the four vacuum columns. Tape drive means comprising a single drive motor is coupled to each of the individual tape advancing means spaced adjacent a tape station.

These and other features of the present invention may be more fully appreciated when considered in the light of the following specification and drawings, in which.

Figure 1:
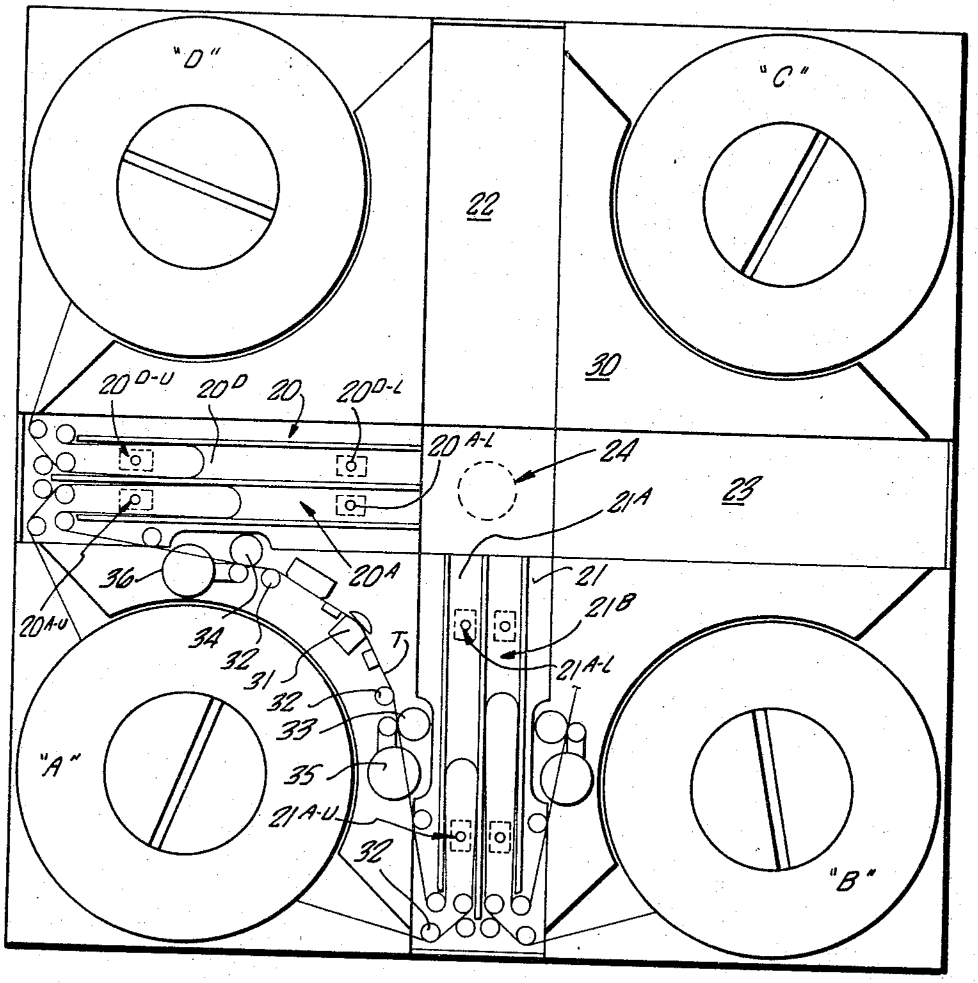
FIG. 1 is a top plan view of a multiple station tape transport system, with a portion of the top cover removed and embodying the invention.

Now referring to the drawings, the multiple station tape transport system embodying the invention will be described as it may be constructed to include four tape stations arranged in the same plane, shown in a horizontal plane in FIG. 1. It should be understood that each of the elements of the tape apparatus of the present invention is well known in the art and that the invention is directed to the structural organization of these elements in a single compact unit.

Figure 2:
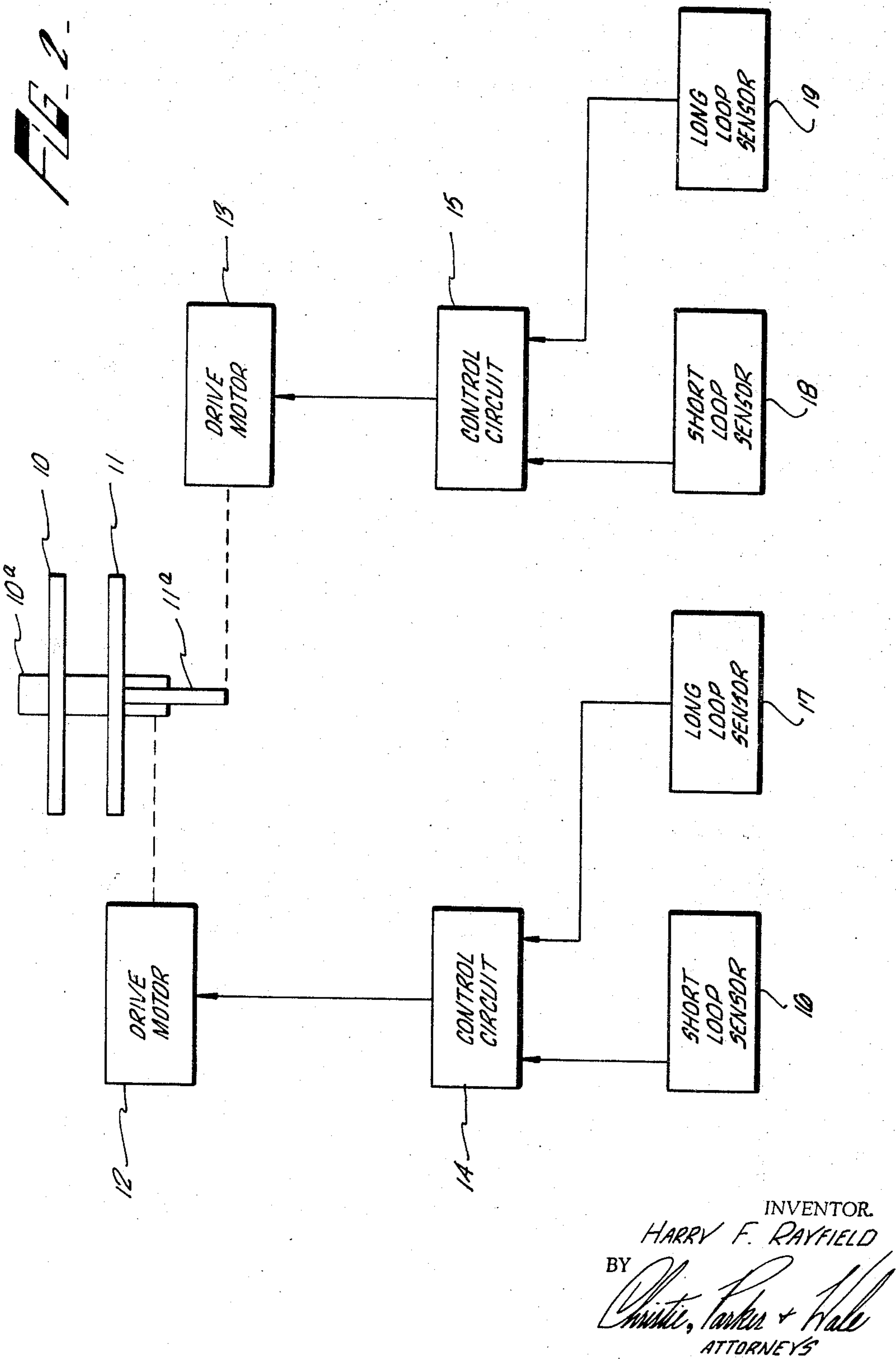
FIG. 2 is a diagrammatic illustration of the arrangement of tape reels and the controls therefor for the system of FIG. 1.

The four tape stations are generally identified by the reference characters A, B, C and D and are arranged adjacent the four corners of the cabinet (not shown) for the tape apparatus. Each of the stations A, B, C and D comprise a pair of coaxially arranged conventional tape reels 10 and 11, as best illustrated in FIG. 2. The tape reels 10 and 11 are mounted on individual drive shafts 10$^a$ and 11$^a$ that are concentrically mounted and coupled to an individual drive motor. A drive motor 12 is coupled to the shaft 10$^a$ for driving the reel 10 which may be considered the supply reel for the tape T, while a drive motor 13 is coupled to drive the shaft 11$^a$ and thereby the reel 11 which functions as the takeup reel. The drive motors 12 and 13 are provided with individual control circuits 14 and 15 connected thereto and which control circuits coact with individual means for providing a signal to control the rate at which the reels 10 and 11 wind and unwind tape respectively, as is conventional. The control circuit 14 arranged with the drive motor 12 for the supply reel 10 is connected to a short loop sensor 16 and a long loop sensor 17. In the same fashion, the control circuit 15 is controlled by a short loop sensor 18 and a long loop sensor 19. The loop sensors 16–19 provide a signal indicating that the lengths of loop of the tape T is either too long or too short for proper operation. For this purpose, the tape T is looped through a vacuum column and the length of loop signals are generated by vacuum operated switches, as will be explained more fully hereinafter. The aforementioned control circuits and the other conventional controls for the tape stations are housed below the reels and are not illustrated as they are not necessary for a complete understanding of the invention.

Figure 3:
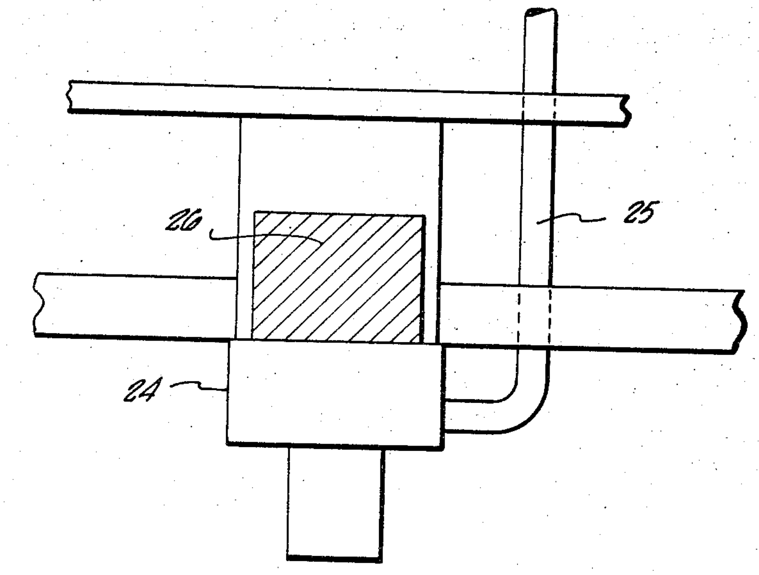
FIG. 3 is a diagrammatic representation of the vacuum source for the system of FIG. 1.

To control the loop lengths for each of the stations A, B, C and D, four dual vacuum columns similar to the dual vacuum columns identified by the reference characters 20 and 21 arranged adjacent the tape station A are provided. The dual vacuum column 20 is arranged intermediate stations A and D, while vacuum column 21 is arranged intermediate stations A and B. A similar dual vacuum column 22 is arranged intermediate the tape stations C and D, while the fourth dual vacuum column 23 is arranged intermediate tape stations B and C. The four dual vacuum columns 20–23 are connected to a single vacuum source illustrated as a vacuum motor 24. As illustrated, the four dual vacuum columns 20–23 form a cross, intersect at a common point substantially centrally of the cabinet, and are in communication with the vacuum source or motor 24; see FIG. 3. The other end of the vacuum source 24 is connected to a conduit 25, as illustrated, to define a closed vacuum system. The vacuum source 24 includes an absolute filter 26 to reduce the contamination of the air circulating in the vacuum system.

The general construction of the vacuum columns is well known in the art. Suffice it to say that for the purposes of the present invention each dual vacuum column is provided with a pair of vacuum operated switches mounted behind the vacuum column proper to function as the short and long loop sensors for any one tape station. Specifically referring to the dual vacuum column 20, it will be seen that the vacuum column 20 comprises the individual vacuum columns $\mathbf{20}^{A}$ and $\mathbf{20}^{D}$. The vacuum column $\mathbf{20}^{A}$ is provided with an aperture $\mathbf{20}^{A-U}$ for operating the vacuum switch indicative of a short length of tape loop in the column $\mathbf{20}^{A}$. In the same fashion, this same loop is indicated as being too long when the switch opposite the aperture $\mathbf{20}^{A-L}$ is operated. The vacuum column $\mathbf{20}^{D}$ comprises the other half of the dual vacuum column 20 and is provided with similar apertures $\mathbf{20}^{D-U}$ and $\mathbf{20}^{D-L}$ for respectively indicating a short loop and a long loop within the column. The tape loops, of course, are defined within a particular vacuum column to be sealed against the side walls and the vacuum source 24 maintains a differential of pressure on the opposite sides of the tape loop. When the tape loop travels beyond one of the apertures $\mathbf{20}^{A-U}$ or $\mathbf{20}^{A-L}$ a signal is provided to the corresponding tape reel drive to speed up or slow down, respectively. With regard to the tape station A, the other reel of the pair of reels defining station A is controlled from the dual vacuum column 21 and, in particular, the vacuum column $\mathbf{21}^{A}$. The vacuum column $\mathbf{21}^{A}$ is further provided with the apertures $\mathbf{21}^{A-L}$ and $\mathbf{21}^{A-U}$ for operating switches to indicate a long and short loop, respectively. If a more comprehensive discussion of these controls is necessary, reference to Patent No. 2,921,753 which is incorporated herein by reference may be had.

It should now be appreciated that the tape station A is controlled by means of the adjacent vacuum columns $\mathbf{20}^{A}$ and $\mathbf{21}^{A}$, while station B is controlled by the vacuum column $\mathbf{21}^{B}$ and the adjacent vacuum column $\mathbf{23}^{B}$ of the dual vacuum column 23. In the same fashion, station D is controlled by the vacuum column $\mathbf{20}^{D}$ and the adjacent vacuum column $\mathbf{22}^{D}$ (not shown) for the vacuum column 22. The remaining vacuum columns ($\mathbf{22}^{C}$ and $\mathbf{23}^{C}$) provide the control for the tape station C. In brief, the pair of vacuum columns associated with each station lie in orthogonal relationship to one another.

Referring once again to FIG. 1 and station A wherein a conventional arrangement of transducers and tape guiding elements is illustrated, it should be appreciated that each of the other transducing stations are similarly arranged on a single precision plate 30. The top surface of plate 30 forms a common work surface along which the tape of each station is transported. A magnetic transducer 31 is mounted on the plate 30 adjacent the pair of reels for the tape station A and arranged with a plurality of tape guiding elements, similar to the guiding elements 32, arranged on opposite sides thereof. The tape advancing means or the forward and reverse capstans are arranged on opposite sides of the transducer 31 and are respectively identified by the reference characters 33 and 34. The forward capstan 33 is arranged with a pinch roller assembly 35 and in the same fashion the reverse capstan 34 is provided with a pinch roller assembly 36. The tape T is guided from one of the reels, the supply reel 10, by means of a tape guide 32 into the vacuum column 21A to form a loop intermediate the apertures $\mathbf{21}^{A-U}$ and $\mathbf{21}^{A-L}$ and out of the vacuum column 21A to be positioned between the capstan 33 and the pinch roller assembly 35. The tape T is then guided past the transducer 31 and positioned between the capstan 34 of the pinch rollers assembly 36. From this tape advancing means the tape T is guided into the vacuum column 20A to be positioned intermediate the apertures $\mathbf{20}^{A-U}$ and $\mathbf{20}^{A-L}$ and then is guided back out of the column to be stored on the takeup reel 11 or the other reel comprising station A.

Figure 4:
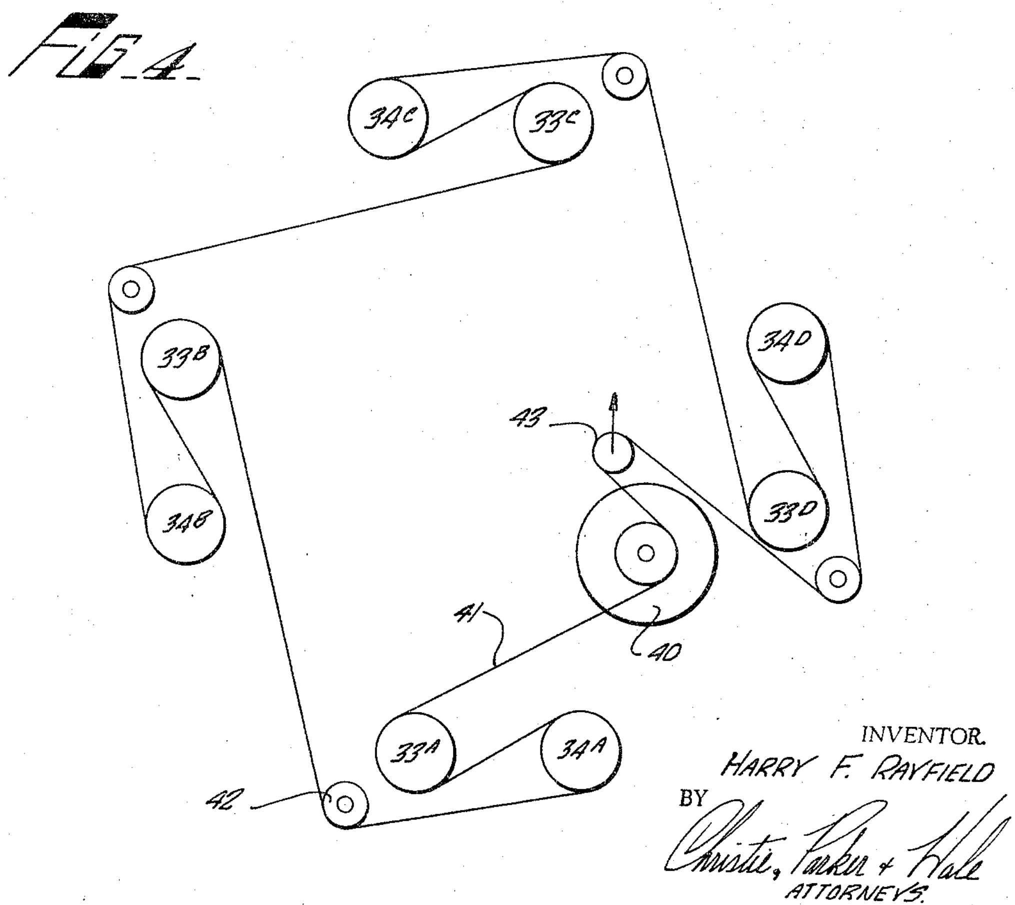
FIG. 4 is a diagrammatic illustration of a typical arrangement for driving each of the tape advancing means or capstans of the tape system of FIG. 1.

An important feature of the invention is that each of the capstans, the forward capstan 33 and the reverse capstan 34 for each tape station is driven by a single drive motor rather than individual drive motors, as in prior art devices. Reference to FIG. 4 will indicate an exemplary arrangement for driving each of the capstans from a single drive source. For this purpose, the drive source, or motor, identified by the reference character 40 is arranged with a single closed loop drive belt 41 coupled to each of the capstans for the four stations. For this purpose the forward and reverse capstans are identified by the respective reference numerals 33 and 34, with the superscript letter corresponding to the tape station. For example, capstan 33A identifies the forward capstan for station A, while the reference numeral $\mathbf{34}^{A}$ identifies the reverse capstan for station A. Intermediate the capstans 33 and 34 suitable belt guides, similar to the guide 42, are provided to change the direction of the drive belt 41 to provide the desired coupling. The guide 43 is provided adjacent the motor 40 and is adapted to be moveable for controlling the tension on the belt 41.

What is claimed is:

1. In tape apparatus the combination comprising a base, a plurality of pairs of coaxially arranged tape reels mounted in proximity to said base in spaced apart relationship, a plurality of dual vacuum columns mounted on the base adjacent said reels, each of said vacuum columns having a pair of loop-length sensors operated by the end of the tape loop passing by same, a single vacuum source coupled to each of said vacuum columns, individual transducing means mounted on the base adjacent each pair of tape reels, individual tape advancing means mounted adjacent said transducing means, individual tape guiding means mounted adjacent said reels and said transducing means for guiding tape from one of said reels of each pair of reels through one of the columns of said dual vacuum columns and past the individual transducing means for each pair of reels through one of the columns of another of said dual vacuum columns to the other reel of each pair of reels, a single tape drive means coupled to each of said individual tape advancing means, and individual reel drive means each coupled to one of said reels and connected to be responsive to the control signal from the sensors.

2. In tape apparatus the combination including first and second tape reels coaxially mounted for transporting tape therebetween, a plurality of vacuum colums adapted to receive a loop of tape therein and having loop-length sensors spaced therein at preselected locations to be on opposite sides of the tape loop, single means coupled to each of said vacuum columns to maintain a pressure differential on opposite sides of the tape loops, transducing means mounted adjacent said reels, tape guiding means mounted adjacent said reels and said transducing means for guiding tape from one of said reels and looped through each of said vacuum columns with the end of the loop being arranged between the sensors and past the transducing means to the other of said reels, and reel drive means coupled to each of said reels and connected to be responsive to the operation of the sensors for maintaining the tape loop intermediate the sensors.

3. In tape apparatus the combination comprising a base, a plurality of pairs of coaxially arranged tape reels mounted in proximity to said base in spaced apart relationship, a plurality of dual vacuum columns mounted on the base adjacent said reels, each of said vacuum columns having a pair of loop-length sensors operated by the end of the tape loop passing beyond the outer extremity thereof, a single vacuum source coupled to each of said vacuum columns, individual transducing means mounted on the base adjacent each pair of tape reels, individual tape guiding means mounted adjacent said reels and said transducing means for guiding tape from one of said reels of each pair of reels through one of the columns of said dual vacuum columns and past the individual transducing means for each pair of reels through one of the columns of another of said dual vacuum columns to the other reel of each pair of reels, and reel drive means coupled to each of said reels and connected to be responsive to the operation of said sensors for controlling the length of tape loop relative to said sensors.

4. In tape apparatus the combination including a base, a plurality of pairs of coaxially arranged tape reels mounted in proximity to said base in spaced apart relationship, individual transducing means mounted on the base adjacent each pair of tape reels, individual means for each pair of tape reels for providing a signal to control the rate at which one of the reels unwinds tape and the other reel of the pair winds tape to maintain a predetermined rate of tape transported past the transducing means, individual tape guiding means mounted adjacent said reels and said individual transducing means for guiding tape from one of the reels of each pair of reels through the individual control means and the individual transducing means to the other reel of each pair of reels, and individual reel drive means coupled to each of said reels and connected to be responsive to the control signal from the corresponding individual control means.

5. In tape apparatus as defined in claim 4 wherein the individual control means comprises a plurality of dual vacuum column means mounted on the base adjacent the pair of reels and having a single column of each dual column employed by a preselected pair of reels.

6. In tape apparatus as defined in claim 4 including individual tape advancing means mounted adjacent an individual transducing means, and a single drive means coupled to drive each of said individual tape advancing means.

7. Multiple station tape handling apparatus comprising: a surface forming a common work plane; a plurality of pairs of coaxially arranged tape storage reels mounted in proximity to said common work plane; means individual to each pair of reels for guiding tape between each reel of the pair and said common work plane; means individual to each pair of reels for guiding tape from said reels in a path along said common work plane, said guiding means including tape buffer means individual to each pair of reels that vary the length of the tape path in the common work plane within predetermined limits; transducing means individual to each pair of reels located along the tape path on said common work plane formed by the corresponding means for guiding tape from said reels along said common work plane; and means individual to each pair of reels for driving tape from said reels past the corresponding transducing means.

8. The tape handling apparatus of claim 7, in which said means individual to each pair of reels for driving the tape past the corresponding transducing means comprises: a pair of vacuum colums mounted to lie in said common work plane, said vacuum columns being adapted to form slack loops in the tape on opposite sides of said transducing means; means for driving each reel so that the length of the slack loop in the corresponding vacuum column is maintained between predetermined limits; and a capstan for driving tape from the slack loop in at least one of said vacuum columns past said transducing means, said capstan being located at a point in the tape path between one of said vacuum columns and said transducing means.

9. The tape handling apparatus of claim 8, in which the vacuum columns of each pair are substantially orthogonal to each other, said pairs being arranged on said common work plane to form a cross that divides said common work plane into quadrants, with each pair of reels being located in a different quadrant.

10. The tape handling apparatus of claim 9, in which the tape from said pair of reels in each quadrant forms slack loops in the directly adjacent vacuum column pair, the tape entering and leaving said vacuum columns from their outer end.

11. The tape handling apparatus of claim 9, in which said transducing means individual to each pair of reels is located on said common work plane in the quadrant corresponding to said reel pair; and said tape guiding means individual to each pair guides the tape from one reel of said pair into the outer end of one vacuum column of the directly adjacent pair to form a slack loop therein, along said common work plane in the quadrant past said transducing means, into the outer end of the other vacuum column of the directly adjacent pair to form a slack loop therein, and to the other reel of said pair.

12. The tape handling apparatus of claim 9, in which the axes of said coaxially arranged tape reels are located substantially along diagonals of the quadrants.

13. The tape handling apparatus of claim 8, in which a single motor is coupled to each capstan.

14. Multiple station tape handling apparatus comprising: a flat plate adapted to accommodate tape handling components; a plurality of pairs of coaxially arranged tape storage reels mounted in spaced apart relationship in proximity to said plate; a pair of vacuum columns corresponding to each reel pair, the vacuum columns corresponding to each reel pair being mounted on said plate in nonparallel relationship to one another; and means corresponding to each reel pair for guiding the tape stored thereon through the corresponding vacuum columns and along the surface of said plate.

15. The apparatus of claim 14, in which the vacuum columns corresponding to each reel pair are mounted on said plate in substantially orthogonal relationship to one another, the vacuum column pairs are arranged in the form of a cross defining quadrants on said plate, said reel pairs are each mounted in the quadrant defined by the corresponding vacuum column pair, and the tape guiding means guides the tape stored on each reel pair along the portion of said plate within the quadrant defined by the corresponding vacuum column pair.

16. Tape handling apparatus comprising: a flat plate adapted to accommodate tape handling components; a pair of coaxially arranged tape storage reels mounted in proximity to said plate; a pair of vacuum columns mounted on said plate in substantially orthogonal relationship to one another such that said reel pair subtends the right angle formed by said vacuum columns; and means for guiding the tape stored on said reels through said vacuum columns and along the portion of said plate between said vacuum columns and said reel pair.

17. The tape handling apparatus of claim 7, in which the tape buffer means individual to each pair of reels comprises at least one vacuum column.

(References on following page)

References Cited

UNITED STATES PATENTS

| | | | |
|---|---|---|---|
| 2,507,385 | 5/1950 | Shrader | 242—54.1 X |
| 2,941,737 | 6/1960 | Jones | 242—55.12 |
| 3,112,473 | 11/1963 | Wicklund et al. | 242—55.12 |

OTHER REFERENCES

IBM Technical Bulletin, volume 2, No. 2, August 1959, p. 8.

LEONARD D. CHRISTIAN, *Primary Examiner.*